United States Patent
Kim

(10) Patent No.: US 9,065,297 B2
(45) Date of Patent: Jun. 23, 2015

(54) METHOD AND APPARATUS FOR CHARGING BATTERY USING SOLAR BATTERY

(75) Inventor: Soo Hyung Kim, Hwasung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 13/161,854

(22) Filed: Jun. 16, 2011

(65) Prior Publication Data

US 2012/0019189 A1     Jan. 26, 2012

(30) Foreign Application Priority Data

Jul. 20, 2010   (KR) .................. 10-2010-0070057

(51) Int. Cl.
| | | |
|---|---|---|
| H01M 10/44 | (2006.01) | |
| H02J 7/00 | (2006.01) | |
| H02J 7/35 | (2006.01) | |
| H01M 10/46 | (2006.01) | |
| H01M 10/48 | (2006.01) | |

(52) U.S. Cl.
CPC .............. *H02J 7/35* (2013.01); *H01M 10/44* (2013.01); *H01M 10/465* (2013.01); *H01M 10/48* (2013.01); *Y02E 10/566* (2013.01)

(58) Field of Classification Search
CPC ............................... H01M 10/465; H02J 7/35
USPC .................................. 320/101, 160; 323/906
See application file for complete search history.

(56) References Cited

U.S. PATENT DOCUMENTS

| | | | | | |
|---|---|---|---|---|---|
| 5,560,218 | A | * | 10/1996 | Jang .............................. | 62/228.4 |
| 6,046,570 | A | * | 4/2000 | Gabbai et al. ................. | 320/101 |
| 8,004,232 | B2 | * | 8/2011 | Schultz ......................... | 320/101 |
| 8,089,242 | B2 | * | 1/2012 | Loudot .......................... | 320/101 |
| 8,461,820 | B2 | * | 6/2013 | Fieldhouse et al. ........... | 323/299 |
| 2008/0278111 | A1 | * | 11/2008 | Genies et al. ................. | 320/101 |
| 2009/0218983 | A1 | * | 9/2009 | Loudot .......................... | 320/101 |
| 2010/0085063 | A1 | * | 4/2010 | Lebrunie et al. .............. | 324/537 |
| 2010/0207571 | A1 | * | 8/2010 | English et al. ................ | 320/101 |
| 2011/0199040 | A1 | * | 8/2011 | English et al. ................ | 320/101 |
| 2011/0265956 | A1 | * | 11/2011 | Cavarec et al. ................ | 160/1 |

FOREIGN PATENT DOCUMENTS

| | | | |
|---|---|---|---|
| FR | 2940812 A1 | * | 7/2010 |
| KR | 10-2006-0091450 A | | 8/2006 |
| KR | 10-2010-0023511 A | | 3/2010 |

\* cited by examiner

*Primary Examiner* — Richard Isla Rodas
*Assistant Examiner* — David V Henze-Gongola
(74) *Attorney, Agent, or Firm* — Jefferson IP Law, LLP

(57) ABSTRACT

A method and an apparatus for charging a battery using a solar cell are provided. The method includes detecting an output state of the solar cell, searching a mapped charging current amount corresponding to the detected output state of the solar cell, setting a charging current amount of a charging unit for charging the battery based on the found charging current amount, and charging the battery with the set charging current amount. The method may maximize charging efficiency of a battery using the solar cell. Furthermore, the method may prevent output power consumption of a solar cell. Accordingly, the method may improve charging efficiency in comparison with a portable terminal of the related art in the same condition to shorten a charging time.

15 Claims, 6 Drawing Sheets

METHOD AND APPARATUS FOR CHARGING BATTERY USING SOLAR BATTERY

PRIORITY

This application claims the benefit under 35 U.S.C. §119 (a) of a Korean patent application filed on Jul. 20, 2010 in the Korean Intellectual Property Office and assigned Serial No. 10-2010-0070057, the entire disclosure of which is hereby incorporated by reference.

BACKGROUND OF THE INVENTION

1. Field of the Invention

The present invention relates to a method and an apparatus for charging a battery using a solar cell. More particularly, the present invention relates to a method for charging a battery using a solar cell capable of charging a battery with maximum power of the solar cell to maximize charging efficiency, and an apparatus thereof.

2. Description of the Related Art

In recent years, with the significant development of information, communication, and semiconductor technology, supply and use of all types of portable terminals have rapidly increased. More particularly, recent portable terminals have developed to a mobile convergence stage including traditional unique fields and other terminal fields. A mobile communication terminal is a portable terminal that provides various functions, such as a TV viewing function (e.g., mobile broadcasting, such as Digital Multimedia Broadcasting (DMB) or Digital Video Broadcasting (DVB)), a music playing function (e.g., a Motion Pictures Expert Group (MPEG) Audio Layer-3 (MP3)), a photographing function, and an Internet access function as well as a communication function, such as voice call or message transmission/reception.

As mobile communication terminals provide various functions, battery life becomes an important factor. However, there is a limitation on increasing the battery life due to a miniaturized characteristic of a mobile terminal. To address this problem, a mobile terminal providing a charging function using a solar cell has recently been provided. However, in a charging method of the related art using a solar cell, the charging current of the battery is constant regardless of an output state of the solar cell. This case deteriorates the charging efficiency. In a charging method and apparatus of the related art using a solar cell, because the battery is not always charged with maximum power of the solar cell, power created from the solar cell may be consumed. A Maximum Power Point Tracking (MPPT) technology tracking maximum solar cells is applicable to the mobile terminal. However, the MPPT technology has problems in that a circuit is complicated and a cost of the mobile terminal is increased due to an additional circuit.

Therefore, a need exists for a method for charging a battery using a solar cell capable of maximizing a charging efficiency, and an apparatus thereof.

SUMMARY OF THE INVENTION

Aspects of the present invention are to address the above-mentioned problems and/or disadvantages and to provide at least the advantages described below. Accordingly, an aspect of the present invention is to provide a method for charging a battery using a solar cell capable of maximizing charging efficiency, and an apparatus thereof.

Another aspect of the present invention is to provide a method for charging a battery using a solar cell that may determine an output state of the solar cell, and flexibly changing a charging current of the battery to a value corresponding to the determined output state of the battery by referring to a stored charging current mapping table, and an apparatus thereof.

In accordance with an aspect of the present invention, a method for charging a battery using a solar cell and for detecting an output state of the solar cell which varies according to intensity of light and temperature is provided. The method includes detecting the output state of the solar cell, searching for a mapped charging current amount corresponding to the detected output state of the solar cell, setting a charging current amount of a charging unit for charging the battery based on the found charging current amount, and charging the battery with the set charging current amount.

In accordance with another aspect of the present invention, an apparatus for charging a battery using a solar cell and for detecting an output state of the solar cell which varies according to intensity of light and temperature is provided. The apparatus includes a state detector for detecting the output state of the solar cell, a charging unit for connecting with the solar cell, and for charging the battery with a mapped charging current amount corresponding to the output state of the solar cell, and a controller for receiving the output state of the solar cell from the state detector, for searching for the charging current amount corresponding to the received output state of the solar cell, and for controlling the charging unit to charge the battery with the found charging current amount.

As described above, a method and an apparatus for charging a battery using a solar cell may maximize the charging efficiency of a battery using the solar cell. Furthermore, exemplary embodiments of the present invention may prevent output power consumption of a solar cell. That is, exemplary embodiments of the present invention may improve charging efficiency in comparison with a portable terminal of the related art in the same condition, and thereby the present invention may shorten a charging time.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

DETAILED DESCRIPTION OF EXEMPLARY EMBODIMENTS

Figure 1:
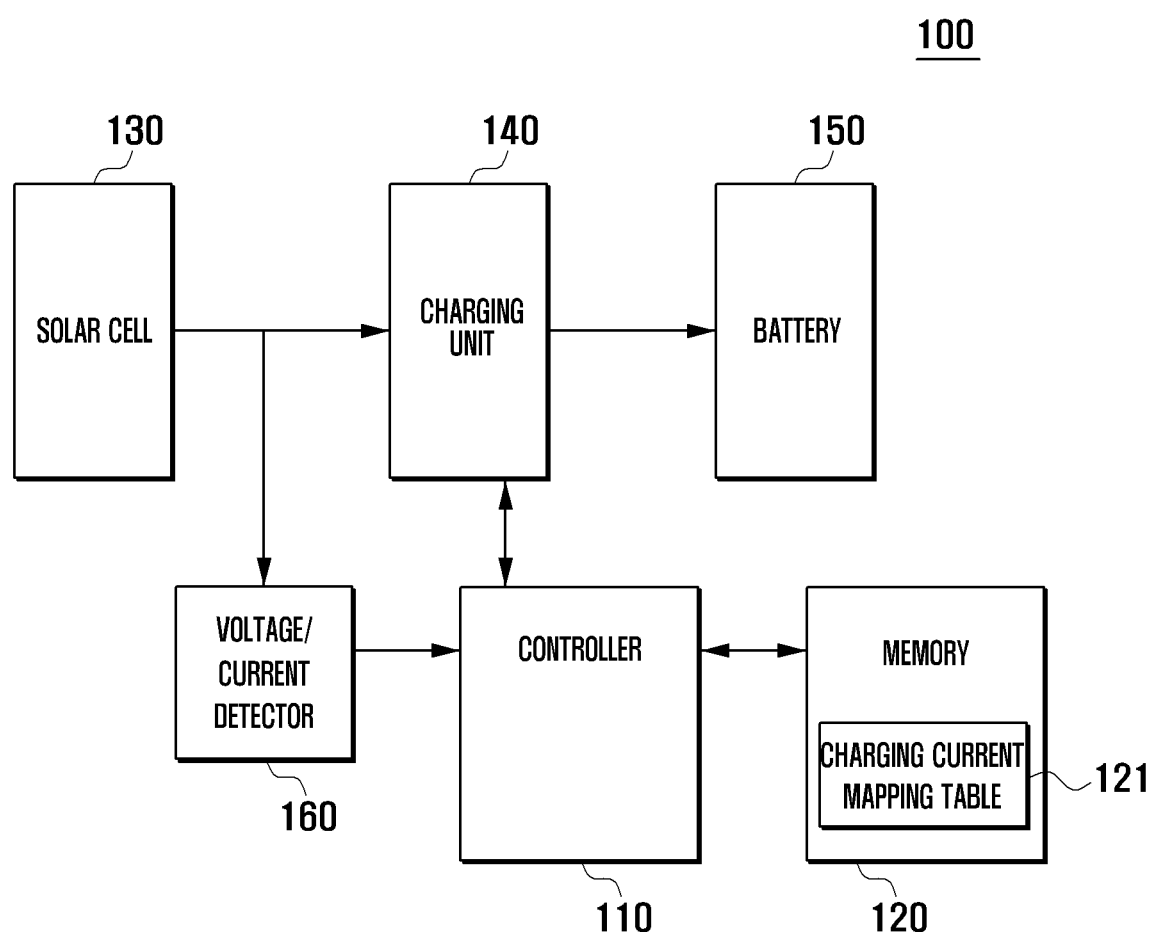
FIG. 1 is a block diagram illustrating a configuration of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, a mobile terminal according to an exemplary embodiment of the present invention is a battery chargeable terminal using a solar cell, and may include a mobile communication terminal, a Personal Digital Assistant (PDA), a Smart Phone, a Portable Multimedia Player (PMP), a PlayStation Portable (PSP) navigation terminal, and the like. Hereinafter, a mobile communication terminal is described as an example of the mobile terminal.

Exemplary embodiments of the present invention are characterized in that a state detector detects an output state of solar cell varying according to intensity of light and temperature in real-time and a battery of the mobile terminal is charged with a set charging current amount corresponding to the detected output state of the solar cell. To this end, exemplary embodiments of the present invention may store a charging current mapping table for mapping an output state of a solar cell to a charging current amount of a charging unit. The state detector may include a voltage/current detector for detecting an output voltage and an output current of the solar cell. The state detector may include at least one of an illumination sensor and a temperature sensor. This is because an output of the solar cell uses a characteristic varying according to illumination and temperature. Hereinafter, a mobile terminal having various constructions according to exemplary embodiments of the present invention is described as an example of the mobile terminal.

FIGS. 1 through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 2:
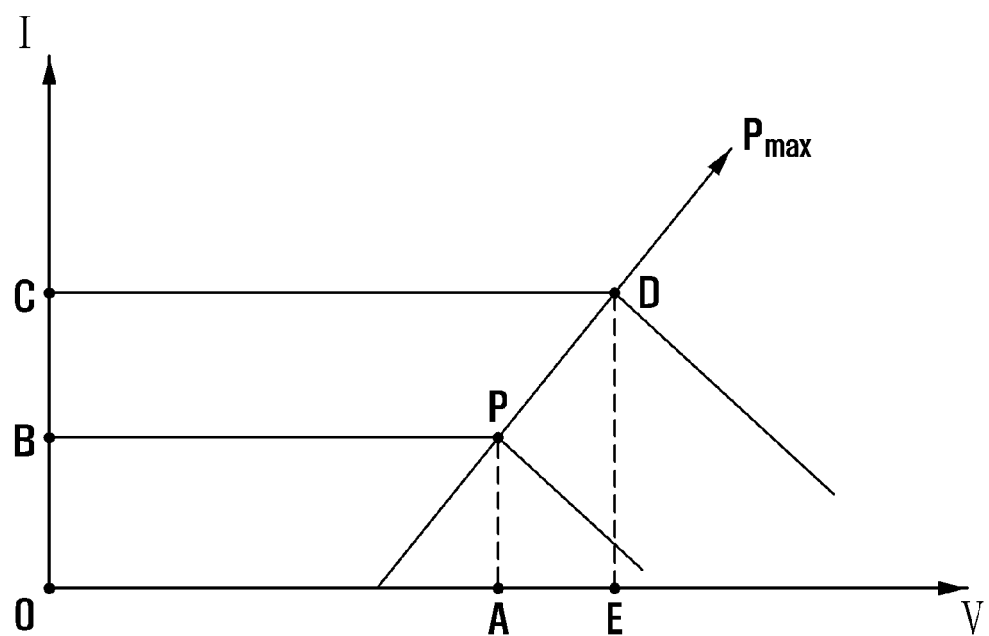
FIG. 2 is a graph illustrating a voltage/current characteristic of a solar cell according to an exemplary embodiment of the present invention.

FIG. 1 is a block diagram illustrating a configuration of a mobile terminal according to an exemplary embodiment of the present invention. FIG. 2 is a graph illustrating a voltage/current characteristic of a solar cell according to an exemplary embodiment of the present invention.

Referring to FIGS. 1 and 2, a mobile terminal 100 may include a controller 110, a memory 120, a solar cell 130, a charging unit 140, a battery 150, and a voltage/current detector 160.

If light is received on a contact surface between a metal and a semiconductor or a PN junction surface of the semiconductor, the solar cell 130 may convert light energy into electrical energy using a photoelectric effect creating an electromotive force. The solar cell 130 may be configured by a plurality of serially or parallel connected solar cells converting light energy into electrical energy. Furthermore, the solar cell 130 may be transparent, translucent, or opaque according to a manufacturing type. For example, when the solar cell is disposed at a body with a cover of the mobile terminal 100, it may be translucent or opaque depending on the manufactured type. When the solar cell is disposed at a display unit (not shown), it may be transparent.

Output power (converted electrical energy) of the solar cell 130 is transmitted to the charging unit 140 for charging the battery 150 of the mobile terminal 100. An output state (output voltage and current) of the solar cell 130 varies according to intensity of light and temperature of the solar cell 130. Referring to FIG. 2, if the intensity of light is increased, an output current of the solar cell 130 is also increased. If the temperature is increased, an output voltage of the solar cell 130 is also increased. In this case, the output current of the solar cell 130 has non-linearity, as shown in FIG. 2. For example, before an output current of the solar cell 130 reaches a maximum power point (e.g., P or D), although a voltage is increased due to temperature increase, the output current stays constant. However, when the output current of the solar cell 130 exceeds a maximum power point (e.g., P or D), it is reduced. That is, the output power of the solar cell 130 increases to a maximum power point (e.g., P or D). However, after the output power of the solar cell 130 exceeds the maximum power point (e.g., P or D), it is reduced. Such characteristics of the solar cell 130 will be apparent to persons of ordinary skill in the art, and thus a detailed description thereof will be omitted.

A charging method and apparatus of the related art for setting a charging current of the charging unit 140 based on a certain condition does not maintain a constant charging efficiency. Referring to FIG. 2, when a charging current of the charging unit 140 is set based on a state as point P, the charging method and apparatus of the related art increases the intensity of light or increases the temperature. Accordingly, although the maximum power point of the solar cell 130 moves to a point D, because the charging unit 140 has the same charging current, all output power of the solar cell 130 is not used to charge the battery 150. That is, when the maximum power point moves to the point D, power corresponding to an area of a square EOCD is output from the solar cell 130. However, the charging method and apparatus of the related art uses only power corresponding to an area of a square AOBP to charge the battery 150, thereby consuming power corresponding to an area difference between a square EOCD and a square AOBP. Accordingly, an exemplary embodiment of the present invention is characterized in that it determines a change in output power of the solar cell according to a change in intensity of light and temperature in realtime or periodically and adaptively changes a charging current of the charging unit 140 according to the determined result.

The voltage/current detector 160 may connect with an output terminal of the solar cell 130 and detect an output voltage and an output current of the solar cell 130. More particularly, the voltage/current detector 160 may transmit the detected output voltage and current of the solar cell 130 to the controller 110.

The charging unit 140 may charge the battery 150 with power supplied from the solar cell 130. More particularly, the charging unit 140 may vary a charging current amount corresponding to the output state of the solar cell 130. The charging unit 140 may adaptively set the charging current amount according to a charging current mapping table 121 stored in the memory 120. A description of the charging current mapping table 121 will be given by referring to the memory 120. The charging unit 140 may adaptively vary the charging current amount under the control of the controller 110 to minimize output power consumption from the solar cell. To this end, the charging unit 140 is configured by a switching charger.

The battery 150 is a chargeable secondary cell, and may be manufactured in various forms, such as a nickel cell, a cadmium cell, a nickel-cadmium cell, a nickel-metal-hydride cell, a chemical cell, a lithium-ion cell, and the like. The battery 150 may be charged by the charging unit 140.

The memory 120 may store an Operating System (OS) of the mobile terminal 100, application programs necessary for other option functions, such as a camera function, a sound playing function, and user data and transmitted and received data. More particularly, the memory 120 may store a charging current mapping table 121 for controlling a charging current of the charging unit 140 corresponding to the output voltage and the output current of the solar cell 130 as listed in a following Table 1.

TABLE 1

| Output voltage of solar cell | Output current of solar cell | Charging current amount of charging unit |
|---|---|---|
| . | . | . |
| . | . | . |
| . | . | . |
| 5.0 V | 10 mA | 12 mA |
| 5.0 V | . | . |
| . | . | . |
| . | . | . |
| 5.0 V | 50 mA | 60 mA |
| . | . | . |
| . | . | . |
| . | . | . |
| 5.2 V | 10 mA | 12.6 mA |
| 5.2 V | . | . |
| . | . | . |
| . | . | . |

TABLE 1-continued

| Output voltage of solar cell | Output current of solar cell | Charging current amount of charging unit |
|---|---|---|
| 5.2 V | 50 mA | 63 mA |
| . | . | . |
| . | . | . |
| . | . | . |
| 5.4 V | 10 mA | 13.1 mA |
| 5.4 V | . | . |
| . | . | . |
| . | . | . |
| 5.4 V | 50 mA | 66 mA |
| . | . | . |
| . | . | . |
| . | . | . |

Referring to Table 1, it may be appreciated that a charging current amount of the charging unit 140 varies corresponding to output power (output voltage and current) of the solar cell. For example, when an output current of the solar cell 130 is increased, although the solar cell 130 has the same output voltage, because the output power of the solar cell 130 is increased, the charging current amount of the charge unit 140 is also increased. Similarly, when an output voltage of the solar cell 130 is increased, although the solar cell 130 has the same output current, because the output power of the solar cell 130 is increased, the charging current amount of the charge unit 140 is also increased. As previously illustrated, power consumption output from the solar cell 130 may be minimized by suitably varying a charging current of the charging unit 140 according to a situation (output voltage and current of the solar cell 140).

Table 1 is one example but may be changed according to performance of the solar cell 130. Furthermore, values of Table 1 may be set as an optimal value through an experiment upon manufacturing the mobile terminal 100. As illustrated above, since a charging current amount of the charging unit 140 corresponding to the output current and the output voltage of the solar cell 130 is optimized through the experiment and stored in the memory 120, an exemplary embodiment of the present invention does not need a separate circuit, such as a Maximum Power Point Tracking (MPPT) circuit for tracking maximum power of the solar cell.

The controller 110 may control an overall operation of the mobile terminal 100 and a signal flow between internal blocks of the mobile terminal 100. More particularly, if a charging function using a solar cell 130 is activated, a controller 110 may receive the output voltage and the output current of the solar cell 130 from the voltage/current detector 160. Thereafter, the controller 110 may search a charging current mapping table 121 stored in the memory 121 to determine a charging current amount of a charging unit 140 mapped to the received output voltage and current of the solar cell 130. The controller 110 may set the charging current amount of the charging unit 140 as the determined charging current amount. That is, the controller 110 may charge a battery 150 with the mapped charging current amount corresponding to an output state of the solar cell 130 varying according to intensity of light and temperature to maintain maximum charging efficiency.

Although not shown in FIG. 1, the mobile terminal 100 may further include structural elements having additional functions, such as an input unit with function keys and hot keys for executing certain functions, an audio processor for playing an audio signal, a broadcast receiving module for receiving broadcast, a digital sound source playing module, such as a Motion Pictures Expert Group (MPEG) Audio Layer-3 (MP3) module, and an Internet communication module executing Internet functions. Since the structural elements can be variously changed according to convergence trend of a digital device, no elements can be listed. However, the portable terminal 100 may include structural elements equivalent to the foregoing structural elements.

Figure 3:
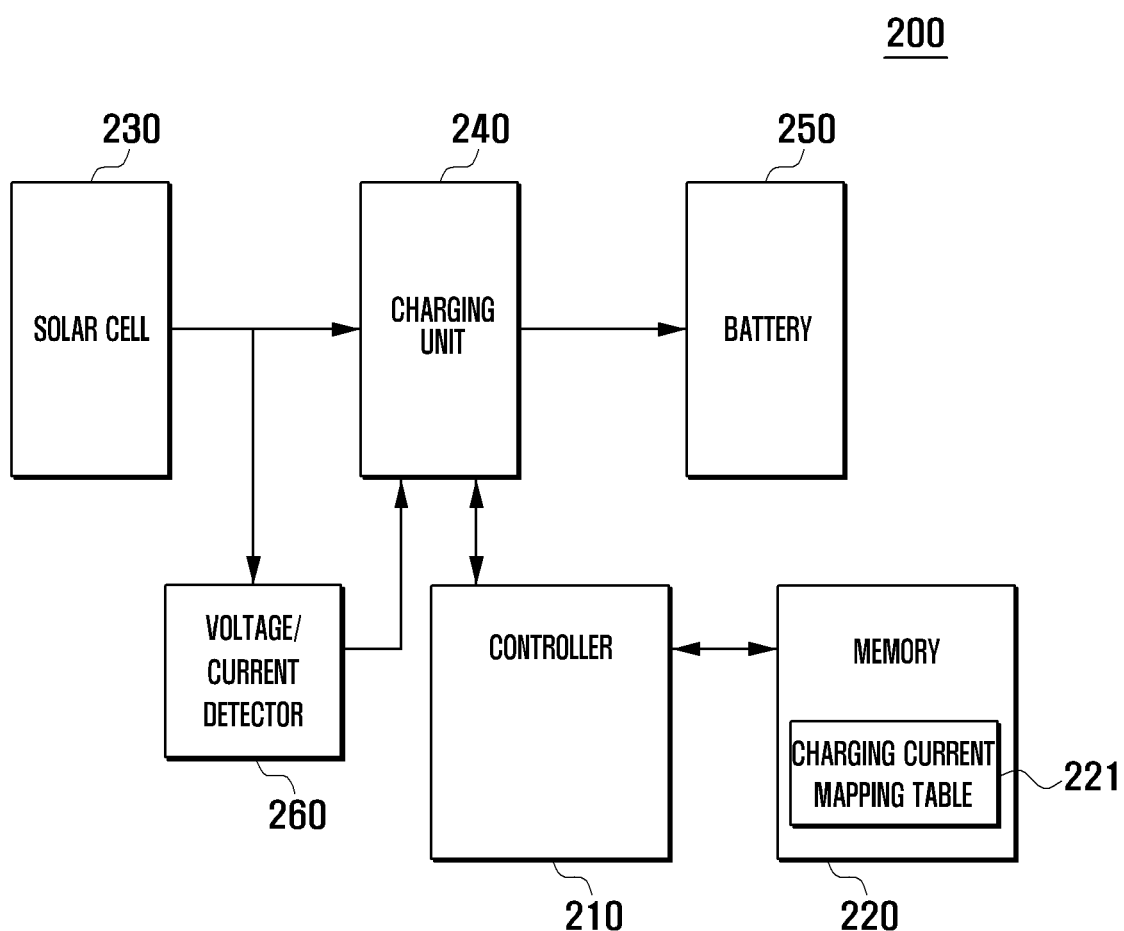
FIG. 3 is a block diagram illustrating a configuration of a mobile terminal according to an exemplary embodiment of the present invention.

FIG. 3 is a block diagram illustrating a configuration of a mobile terminal according to an exemplary embodiment of the present invention.

Referring to FIG. 3, a mobile terminal 200 may include a controller 210, a memory 220, a solar cell 230, a charging unit 240, a battery 250, and a voltage/current detector 260. The charging unit 240 may adaptively set the charging current amount according to a charging current mapping table 221 stored in the memory 220. The difference between this and the aforementioned exemplary embodiment of the present invention is that an output voltage and an output current of the solar cell 230 detected by the voltage/current detector 260 are transmitted to the charging unit 240, and the charging unit 240 again transmits the output voltage and the output current of a solar cell 230 provided from the voltage/current detector 260 to the controller 210. Apart from this difference, both exemplary embodiments of the present invention have substantially the same functions, and thus a detailed description thereof will be omitted.

Figure 4:
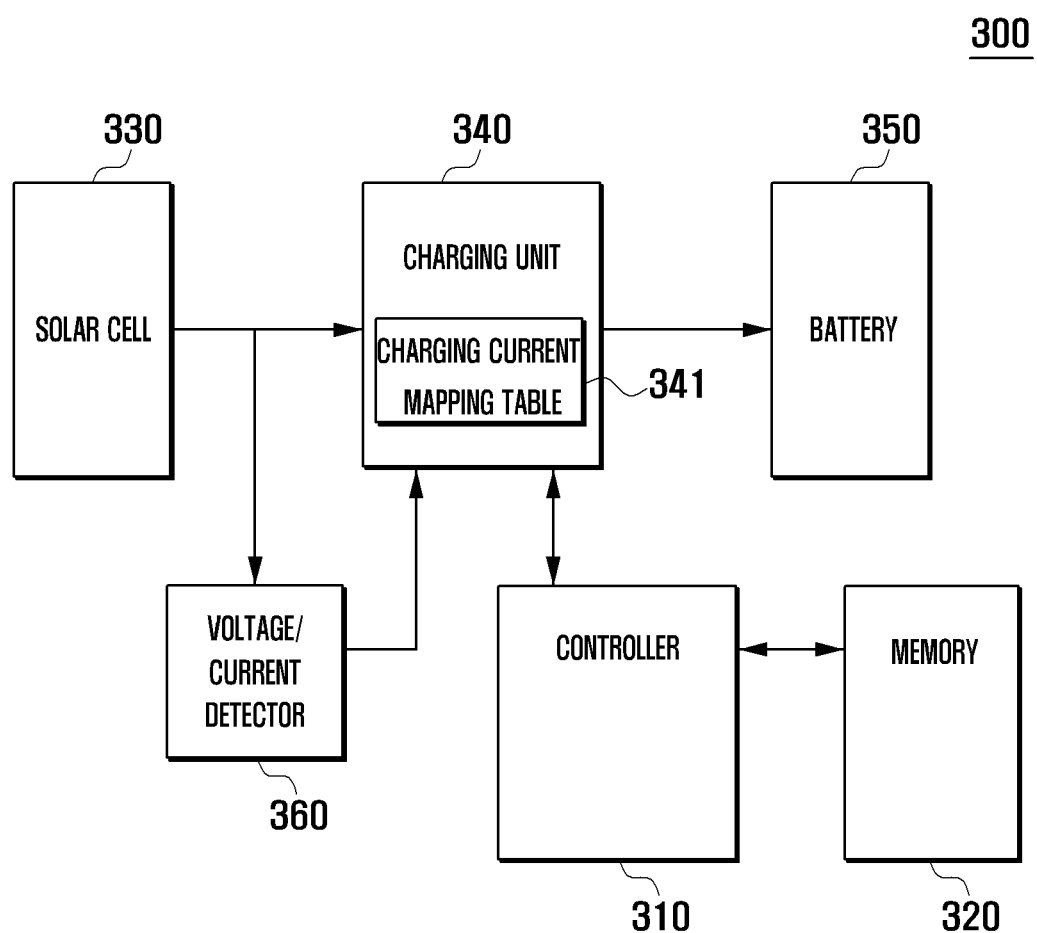
FIG. 4 is a block diagram illustrating a configuration of a mobile terminal according to an exemplary embodiment of the present invention.

FIG. 4 is a block diagram illustrating a configuration of a mobile terminal according to an exemplary embodiment of the present invention.

Referring to FIG. 4, a mobile terminal 300 may include a controller 310, a memory 320, a solar cell 330, a charging unit 340, a battery 350, and a voltage/current detector 360.

A charging current mapping table 341 may not be stored in the memory 320 but stored in the charging unit 340 unlike the aforementioned exemplary embodiments of the present invention. To this end, the charging unit 340 has a storing function. Furthermore, an output signal of the voltage/current detector 360 is transmitted to the charging unit 340. That is, the charging unit 340 may receive an output voltage and an output current of a solar cell 330 from the voltage/current detector 360, and search a charging current amount of the charging unit 340 from the charging current mapping table 341, and charge the battery 350 with the found charging current amount. That is, the charging unit 340 may execute partial functions of the controller 110 or the controller 210. In this case, the controller 310 may control only a fundamental operation of the charging unit 340. Except for the forgoing differences, this exemplary embodiment of the present invention is similar to the aforementioned exemplary embodiments of the present invention, and thus a detailed description of remaining constructions of FIG. 3 is omitted. When the voltage/current detector 360 and the charging unit 340 are driven by power of the battery 350, a mobile terminal 300 may adaptively vary a charging current amount of the charging unit 340 at the power off time to charge the battery 350.

Figure 5:
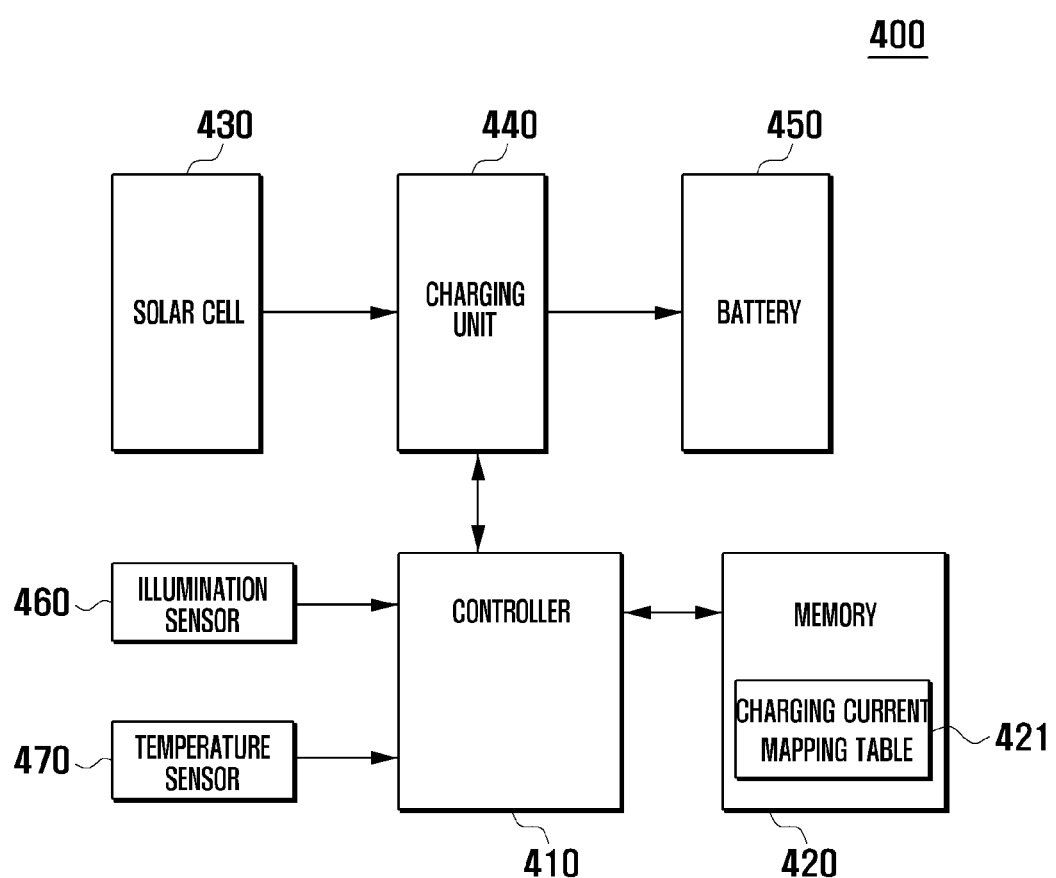
FIG. 5 is a block diagram illustrating a configuration of a mobile terminal according to an exemplary embodiment of the present invention.

FIG. 5 is a block diagram illustrating a configuration of a mobile terminal according to an exemplary embodiment of the present invention.

Referring to FIG. 5, a mobile terminal 400 may include a controller 410, a memory 420, a solar cell 430, a charging unit 440, a battery 450, an illumination sensor 460, and a temperature sensor 470.

The illumination sensor 460 may detect light to output an electrical signal corresponding to input of the light. More particularly, the illumination sensor 460 varies a voltage output according to intensity of the light. The output voltage of the illumination sensor 460 may be transmitted to the controller 410. Through this, the controller 410 may detect intensity of the light and recognize an output voltage of the solar cell 430 according to the detected intensity of the light. The illumination sensor 460 is located adjacent to the solar cell 430 to exactly detect intensity of light received on the solar cell 430.

The temperature sensor 470 may detect the temperature of the solar cell 430 and transmit a corresponding voltage to the controller 410. The temperature sensor 470 may be included to determine a charging current of the charging unit 440 in consideration of change in output power of the solar cell 430 according to temperature variation. The temperature sensor 470 may be configured by a thermistor and located adjacent to the solar cell 430 to detect the temperature of the solar cell 430.

In an exemplary implementation of the present invention, when variation of output power according to the temperature of the solar cell 430 is not great, the temperature sensor 470 is omitted and only intensity of light is detected to change a charging current of the charging unit 440. When variation of output power according to the intensity of light of the solar cell 430 is not great, the illumination sensor 460 may be omitted.

The memory 420 may store a charging current mapping table 421 for mapping a charging current to voltages detected from the illumination sensor 460 and the temperature sensor 470, but is not limited thereto. For example, the charging current mapping table 421 may be stored in the charging unit 440. A charging current amount corresponding to intensity of light and temperature is mapped to the charging current mapping table 421.

The controller 410 may determine intensity of light and temperature of the solar cell 430 using the illumination sensor 460 and the temperature sensor 470, search a charging current amount of the charging unit 440 from the charging current mapping table 421 stored in the memory 120 corresponding to the determined intensity of light and temperature of the solar cell 430, and control the charging unit 440 to charge the battery 450 with the found charging current amount.

In conclusion, the mobile terminal 400 may determine intensity of light and temperature of a solar cell 430 using at least one of the illumination sensor 460 and the temperature sensor 470 instead of the voltage/current detector 160, 260, or 360, and control a charging current of the charging unit 440 corresponding to the determined result. Other operations are substantially identical with the aforementioned exemplary embodiments of the present invention, and thus a detailed description thereof is omitted.

Figure 6:
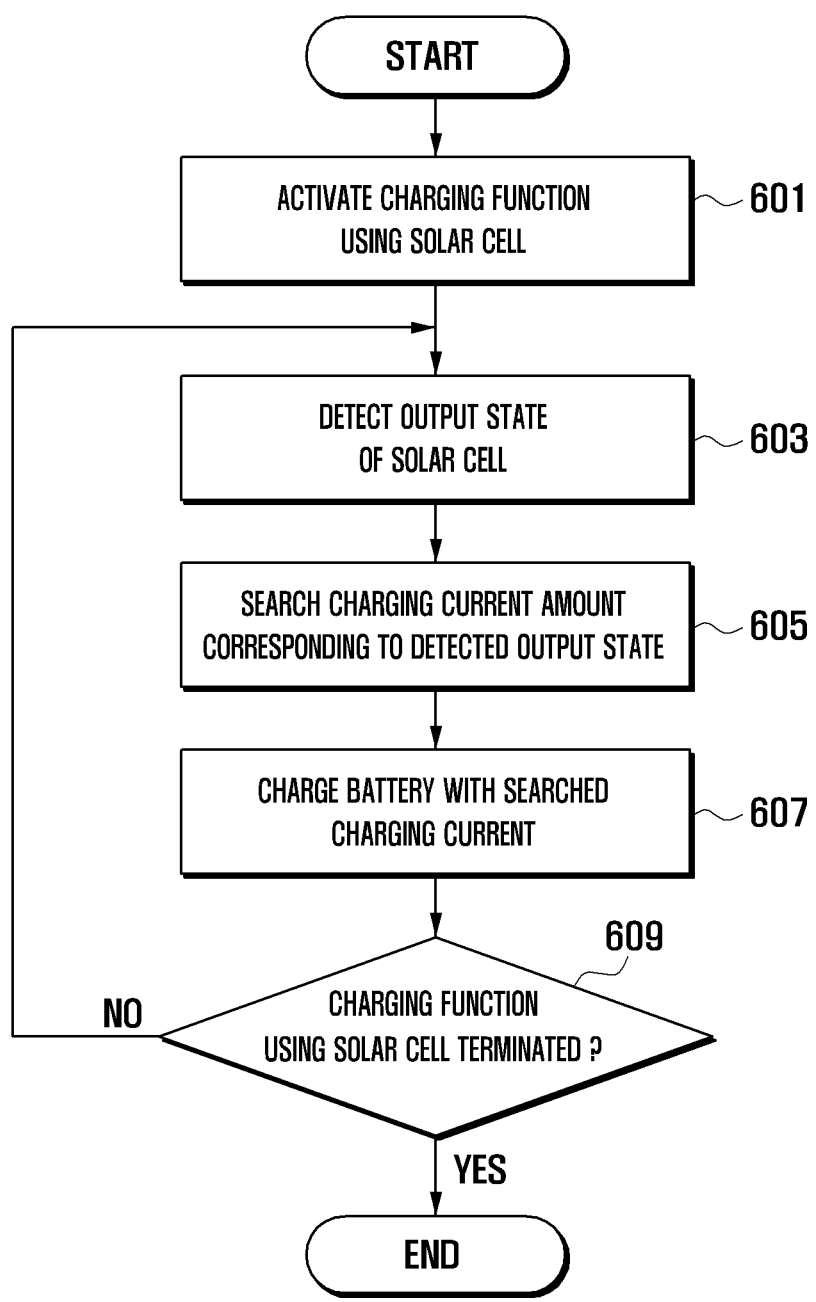
FIG. 6 is a flowchart illustrating a method for charging a battery using a solar cell according to an exemplary embodiment of the present invention.

FIG. 6 is a flowchart illustrating a method for charging a battery using a solar cell according to an exemplary embodiment of the present invention.

Referring to FIG. 6, a controller may activate a charging function using a solar cell in step 601. When the charging function is activated, the controller may detect an output state of the solar cell in step 603. To this end, the mobile terminal may include a state detector. The state detector may include a voltage/current detector as shown in FIG. 1, FIG. 3, and FIG. 4. The state detector may include an illumination sensor and a temperature sensor as shown in FIG. 5. When the state detector is the voltage/current detector, step 603 is a step that detects and transmits an output voltage and an output current of a solar cell to a controller. When the state detector is the illumination sensor and the temperature sensor, step 603 is a step that measures intensity of light through the illumination sensor and measures the temperature of the solar cell through the temperature sensor, and transmits the measured intensity of light and temperature of the solar cell to the controller.

Thereafter, the controller may search a charging current amount corresponding to the detected output state of the solar cell in step 605. To this end, the mobile terminal may store a charging current mapping table. The charging current mapping table may be stored in a memory shown in FIG. 1, FIG. 3, and FIG. 5. Meanwhile, the charging current mapping table may be stored in the charging unit shown in FIG. 4.

When searching the charging current amount is terminated, the controller may control the charging unit to charge a battery with the found charging current in step 607. More particularly, the controller may set the charging current amount of the charging unit as the found charging current amount to control the charging unit to charge the battery with the set charging current amount.

Step 607 may be performed by the charging unit as illustrated in FIG. 4. In this case, the controller controls only a fundamental operation of the charging unit. For example, the controller may control power on/off of the charging unit.

Subsequently, the controller may determine whether a charging function using the solar cell is terminated in step 609. The charging function using the solar cell may be terminated when the mobile terminal is situated at a location where there is no light or there is weak light not allowing a charging operation. If it is determined in step 609 that the charging function using the solar cell is not terminated, the controller returns to step 603 and repeats the foregoing procedures. As previously illustrated, an exemplary embodiment of the present invention may continuously determine an output state of a solar cell to adaptively control a charging current of a charging unit such that output power from the solar cell is not consumed, thereby maximizing charging efficiency of a battery and reducing a charging time of the battery. Furthermore, when an overload is applied to the controller as the continuous determining result of the output state of the solar cell, the output state of the solar cell may be set to be determined at a predefined interval.

Meanwhile, a method for charging a battery using a solar cell according to an exemplary embodiment of the present invention may be implemented in an executable program command form by various computer means and be recorded in a computer readable recording medium. In this case, the computer readable recording medium may include a program command, a data file, and a data structure individually or a combination thereof. The program command recorded in a recording medium may be specially designed or configured for the exemplary embodiments of the present invention or be known to a person having ordinary skill in a computer software field to be used.

The computer readable recording medium includes Magnetic Media, such as a hard disk, a floppy disk, or a magnetic tape, an Optical Media, such as a Compact Disc Read Only Memory (CD-ROM) or a Digital Versatile Disc (DVD), a Magneto-Optical Media, such as a floptical disk, and a hardware device, such as a ROM, a Random Access Memory (RAM), a flash memory for storing and executing program commands. Furthermore, the program command includes a machine language code created by a complier and a high-level language code executable by a computer using an interpreter. The foregoing hardware device may be configured to be operated as at least one software module to perform an operation of the present invention, and a reverse operation thereof is the same.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method comprising:
   charging a battery with a first charging current by a charging unit;
   detecting an output state of a solar cell which varies according to intensity of light or temperature;
   identifying an amount of a second charging current corresponding to the detected output state of the solar cell from at least one of current data stored in an electronic device as a look up table; and
   charging the battery with a charging current determined without a Maximum Power Point Tracking (MPPT) algorithm, wherein the charging current comprises a substantially continuous current having the identified amount of the second charging current.

2. The method of claim 1, wherein the detecting of the output state comprises detecting an output voltage and an output current of the solar cell using a voltage/current detector for connecting with an output terminal of the solar cell.

3. The method of claim 1, wherein the detecting of the output state comprises at least one of:
   measuring intensity of solar light using an illumination sensor capable of detecting intensity of light; and
   measuring the temperature of the solar cell using a temperature sensor capable of detecting temperature.

4. The method of claim 2, wherein the identifying of the amount comprises identifying the amount of the second charging current corresponding to the detected output voltage and the output current of the solar cell from the look up table.

5. An apparatus comprising:
   a solar cell;
   a state detector for detecting an output state of the solar cell;
   a charging unit for connecting with the solar cell and for charging a battery; and
   a controller for controlling the charging unit to charge the battery with a first charging current, for receiving the output state of the solar cell from the state detector, for identifying an amount of the second charging current corresponding to the detected output state of the solar cell from the look up table, and for controlling the charging unit to charge the battery with a charging current determined without a Maximum Power Point Tracking (MPPT) algorithm, wherein the charging current comprises a substantially continuous current having the identified amount of the second charging current.

6. The apparatus of claim 5, further comprising a memory for storing the look up table for mapping an amount of a charging current of the charging unit to the output state of the solar cell.

7. The apparatus of claim 5, wherein the charging unit stores the look up table for mapping an amount of a charging current of the charging unit to the output state of the solar cell.

8. The apparatus of claim 5, wherein the state detector connects with an output terminal of the solar cell, and comprises a voltage/current detector for detecting an output voltage and an output current of the solar cell.

9. The apparatus of claim 8, wherein, when the voltage/current detector and the charging unit are driven by power of the battery, a mobile terminal varies a charging current of the charging unit at the power off time to charge the battery.

10. The apparatus of claim 8, wherein the voltage/current detector transmits the output voltage and the output current of the solar cell to the controller.

11. The apparatus of claim 8, wherein the voltage/current detector transmits the output voltage and the output current of the solar cell to the charging unit.

12. The apparatus of claim 11, wherein the charging unit again transmits the output voltage and the output current of the solar cell received from the voltage/current detector to the controller.

13. The apparatus of claim 11, wherein the charging unit identifying the amount of the second charging current corresponding to the received output voltage and current of the solar cell from the look up table.

14. The apparatus of claim 5, wherein the state detector comprises:
   a temperature sensor for detecting the temperature of the solar cell; and
   an illumination sensor for detecting the intensity of light.

15. The apparatus of claim 14, wherein the illumination sensor varies a voltage output according to intensity of the light.

\* \* \* \* \*